(12) United States Patent
Neet

(10) Patent No.: US 9,163,600 B2
(45) Date of Patent: Oct. 20, 2015

(54) CHARGING IN MULTIPLE VOLTAGE START/STOP BAS SYSTEM

(71) Applicant: Remy Technologies, LLC, Pendleton, IN (US)

(72) Inventor: Kirk Neet, Pendleton, IN (US)

(73) Assignee: Remy Technologies, LLC, Pendleton, IN (US)

( * ) Notice: Subject to any disclaimer, the term of this patent is extended or adjusted under 35 U.S.C. 154(b) by 79 days.

(21) Appl. No.: 13/911,462

(22) Filed: Jun. 6, 2013

(65) Prior Publication Data

US 2014/0361536 A1 Dec. 11, 2014

(51) Int. Cl.
| | |
|---|---|
| *F02N 11/04* | (2006.01) |
| *H02K 23/52* | (2006.01) |
| *H02P 9/04* | (2006.01) |
| *H02P 9/00* | (2006.01) |
| *B60W 10/08* | (2006.01) |
| *F02N 11/08* | (2006.01) |
| *H02J 7/14* | (2006.01) |

(52) U.S. Cl.
CPC ............. *F02N 11/04* (2013.01); *B60W 10/08* (2013.01); *F02N 11/087* (2013.01); *F02N 11/0866* (2013.01); *H02J 7/1423* (2013.01); *F02N 2011/0874* (2013.01); *F02N 2011/0896* (2013.01); *F02N 2200/041* (2013.01); *F02N 2200/063* (2013.01)

(58) Field of Classification Search
CPC ............ B60L 11/1851; B60L 11/1855; B60L 11/1864; B60L 11/1877; H01M 10/441; H02J 7/0024; H02J 7/1423

USPC ......... 290/31, 7, 16, 50; 318/139; 307/37, 71; 180/65.1, 65.245; 701/22; 903/903, 903/907, 960
See application file for complete search history.

(56) References Cited

U.S. PATENT DOCUMENTS

| | | | | | |
|---|---|---|---|---|---|
| 688,494 | A | * | 12/1901 | Stern | 290/1 R |
| 4,607,208 | A | * | 8/1986 | Vreeland | 320/145 |
| 6,082,476 | A | * | 7/2000 | Stulbach | 180/65.25 |
| 6,140,799 | A | * | 10/2000 | Thomasson | 320/117 |
| 6,177,734 | B1 | * | 1/2001 | Masberg et al. | 290/31 |
| 6,342,769 | B1 | * | 1/2002 | Birkestrand et al. | 318/139 |
| 6,583,599 | B1 | * | 6/2003 | Phillips et al. | 320/104 |
| 6,639,408 | B2 | * | 10/2003 | Yudahira et al. | 324/434 |
| 6,734,645 | B2 | * | 5/2004 | Auerbach | 318/139 |
| 7,183,746 | B1 | * | 2/2007 | Carter | 320/116 |
| 7,692,404 | B2 | * | 4/2010 | Harris | 320/117 |
| 2011/0015828 | A1 | * | 1/2011 | Shimizu | 701/43 |
| 2011/0257823 | A1 | * | 10/2011 | Watanabe | 701/22 |

* cited by examiner

*Primary Examiner* — Tulsidas C Patel
*Assistant Examiner* — Charles Reid, Jr.
(74) *Attorney, Agent, or Firm* — Bose McKinne & Evans LLP

(57) ABSTRACT

An alternator-starter system and method is disclosed. A method of operating an alternator-starter having an inverter/rectifier for starting an engine and charging a plurality of batteries includes providing two switches for each battery, monitoring voltages of each of the plurality of batteries, and switching the switches to selectively charge individual ones of the plurality of batteries. A system includes a plurality of batteries connected in series, and includes first and second switches for each battery, the first switch being operable to switchably connect the upper rail of the inverter/rectifier with the respective (+) terminal, the second switch being operable to switchably connect the lower rail of the inverter/rectifier with the respective (−) terminal. A high voltage configuration may be utilized for motoring and generating modes.

18 Claims, 5 Drawing Sheets

CHARGING IN MULTIPLE VOLTAGE START/STOP BAS SYSTEM

BACKGROUND

The present invention is directed to automotive electrical systems and, more particularly, to a system for controllably implementing a motoring mode and a generating mode.

Electric generators used in automotive vehicles include multiphase alternators that generate alternating current (AC) electric power when a rotor of the alternator is mechanically rotated, such as by a belt coupled to a motor of the vehicle. A rectifier bridge is typically used to convert the AC electric power output to direct current (DC) electric power for charging one or more vehicle batteries and for powering DC loads. Commonly used rectifier bridges for automotive alternators are formed with diodes and/or metal-oxide-semiconductor field-effect transistors (MOSFETs) and allow for current flow in one direction only. The current flow in a diode is determined by the voltage differential between the anode and cathode, such that when the anode voltage overcomes the forward diode drop and any voltage present on the cathode, a current will flow through the diode. Since the current flow in a diode is based only on voltage differentials, no external controls or circuitry are required for determining when the current should flow. Accordingly, a given rectifier diode bridge configuration may easily be adapted for a chosen phase configuration. When the diodes of a rectifier bridge are replaced with MOSFETs, the efficiency of the rectification is significantly increased because electrical power losses of MOSFETs are much less than those of diodes.

An automotive alternator-starter is typically configured to operate in a generating mode for charging one or more batteries, and to operate in a motoring mode. The rotor of the alternator-starter is mechanically connected to the internal combustion engine (ICE), whereby mechanical rotational power is transferred from the ICE to the rotor in generating mode and from the rotor to the ICE in the motoring mode. The mechanical connection may include a direct connection, a pulley, a belt, and/or other mechanism(s) such as gears, clutch assemblies, etc. In the generating mode, rotation of the ICE causes the rotor of the alternator-starter to rotate, thereby generating a battery charging current. In the motoring mode, the alternator-starter operates as a high torque motor for starting an ICE and/or for use at a lower torque as an auxiliary motor, such as for driving an air conditioning compressor, for preventing the ICE from stalling, and/or for powering the vehicle over short distances. Modern automotive alternators are generally required to supply ever-greater amounts of electrical current. For example, hybrid vehicles may use electricity instead of internal combustion for driving the wheels. Other electrical loading from air conditioning, electric power steering, and other vehicle systems further increases the required alternator electrical capacity.

An automotive alternator-starter is typically an electric machine having a multiple-phase stator winding that acts as an armature in alternator/generating mode. The stator may receive an AC voltage from an inverter when operating in a motoring mode. The electric machine has a rotor that may be in electrical communication with a DC power source in a traditional alternator design that utilizes excitation windings, brushes, and a commutator. In various forms, the electric machine may be brushless and may include permanent magnets. An alternator-starter typically is operated with one or more sensors, a voltage regulator, and a controller. For example, a battery state of charge, temperature, and/or voltage may be monitored for adjusting a charging current being output in a generating mode, for determining whether sufficient battery power is available for an auxiliary motoring function, and for other operations.

In electrical automotive applications such as those implemented in hybrid vehicles, an alternator-starter may be integrated into battery charging that includes regenerative braking, solar panels, plug-in and/or inductive powering of a separate battery charger, and other devices. An alternator-starter may operate in a so-called start-stop mode. For example, a hybrid automotive vehicle's ICE may be turned off during an 'idle' event such as when the vehicle is stopped at a traffic light, and then the alternator-starter is required to quickly and efficiently re-start the ICE after the idle event is over. In particular, mechanically driving the gears that cold start or re-start the ICE requires that the alternator-starter operate in motoring mode with a high torque at low rotation speeds. In order to increase the torque for a starting event, a conventional alternator-starter might be formed with a reduced number of stator turns, but this is typically undesirable for the voltage generation in generating mode. Alternatively, a conventional alternator-starter may increase voltage excitation of the rotor, but this is also undesirable for voltage generation in the generating mode. Another conventional alternator-starter has utilized two separate batteries, where the inverter is connected by a MOSFET switch to the positive terminal of a second battery in motoring mode, and where the rectifier bridge is connected by another MOSFET switch to the positive terminal of the main battery when the alternator-starter is operating in alternator mode. However, conventional alternator-starters are not optimized for both start-stop and charging operations.

SUMMARY

It is therefore desirable to obviate the above-mentioned disadvantages by providing an alternator-starter system and method that utilizes a plurality of batteries during start-stop operations. The batteries are connected in series.

According to an exemplary embodiment, an alternator-starter system includes a stator having three coils, and includes an inverter/rectifier having three nodes connected to respective ones of the stator coils, the inverter/rectifier having an upper rail and a lower rail defining a DC bus. The system also includes a plurality of batteries connected in series, each battery having a positive (+) terminal and a negative (−) terminal, and includes first and second switches for each battery, the first switch being operable to switchably connect the upper rail with the respective (+) terminal, the second switch being operable to switchably connect the lower rail with the respective (−) terminal. The system further includes a controller operable to monitor voltages of each battery.

According to another exemplary embodiment, a method of operating an alternator-starter having an inverter/rectifier for starting an engine and charging a plurality of batteries is disclosed. The method includes providing two switches for each battery, monitoring voltages of each of the plurality of batteries, and switching the switches to selectively charge individual ones of the plurality of batteries.

According to a further exemplary embodiment, a method is disclosed for operating an alternator-starter having a stator with at least three coils, and having an inverter/rectifier that includes at least three nodes connected to respective ones of the stator coils, the inverter/rectifier having an upper rail and a lower rail defining a DC bus. The method includes providing a plurality of batteries connected in series, each battery having a positive (+) terminal and a negative (−) terminal, providing first and second switches for each battery, the first switch being operable to switchably connect the upper rail with the respective (+) terminal, the second switch being operable to switchably connect the lower rail with the respective (−) terminal, and monitoring voltages of each battery.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein.

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1:
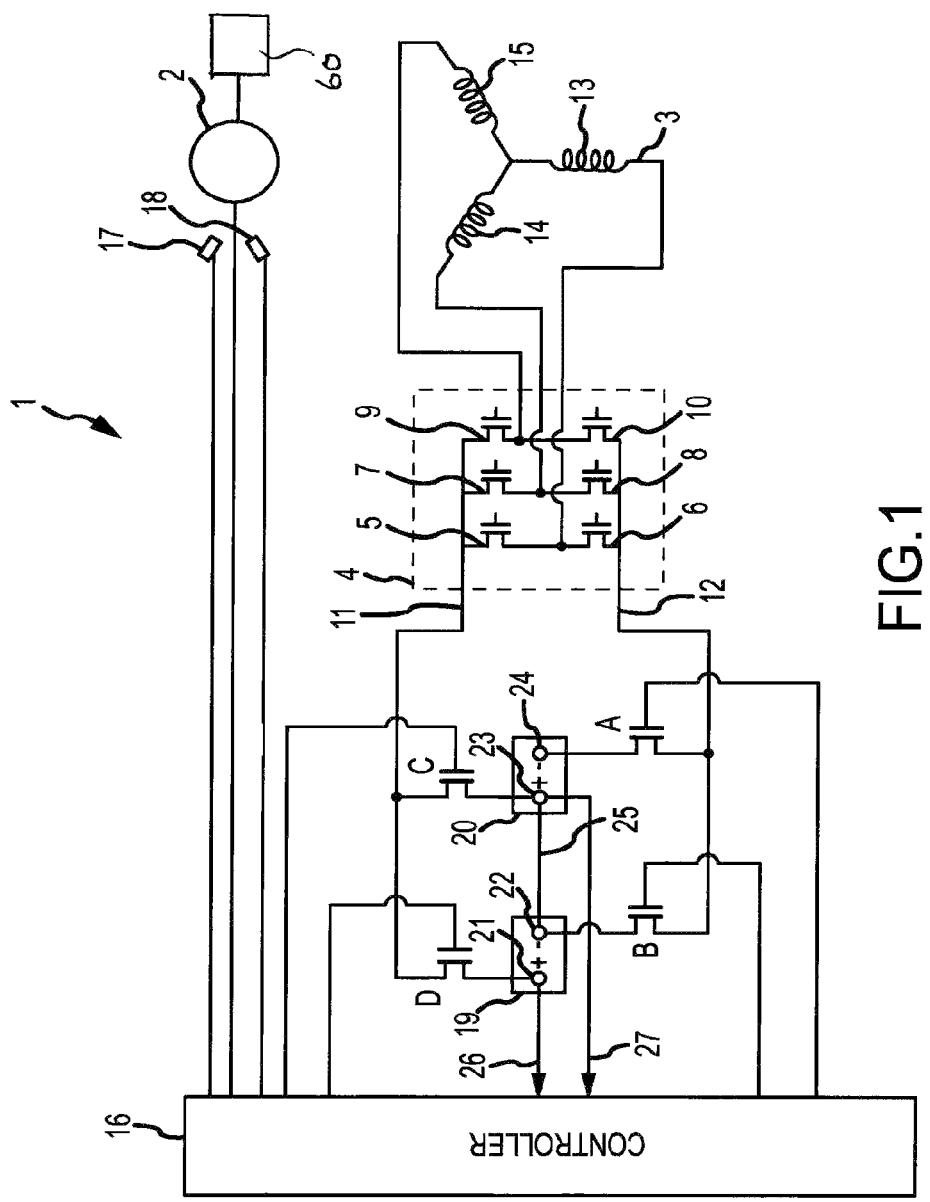
FIG. 1 is a schematic diagram of an alternator-starter system, according to an exemplary embodiment.

FIG. 1 is a schematic diagram of an alternator-starter system 1 according to an exemplary embodiment. A rotor 2 is mechanically coupled to an ICE 60 using a direct connection, pulley, belt, and/or other mechanism(s) such as gears, clutch assemblies, etc. (not shown). In an alternator or generating mode, rotor 2 is mechanically driven by the ICE. Rotor 2 may include one or more windings that are electrically excited by an external power source via a known assembly having brushes and a commutator. Alternatively, for example, rotor 2 may be structured without a brush assembly. A multiple-phase stator 3 surrounds rotor 2 in the radial direction (not shown in FIGS. 1 and 2) and operates as an armature in alternator mode, and contains a number of phase coils that provide an alternating current (AC) to an inverter/rectifier bridge 4. For a three-phase alternator-starter, inverter/rectifier bridge 4 is formed using six switching elements. The switching elements may be formed using any suitable type of switch, herein shown as field effect transistor (FET) devices, MOSFET devices 5-10. Bridge 4, as described further below, acts as an inverter when alternator-starter system 1 is operating in motoring mode. Therefore, MOSFET bridge 4 is herein referred to as inverter/rectifier 4. Alternatively, rectification may be accomplished by rectifier diodes and an inverter may be formed with any suitable components and configuration. The inverter may have a sine wave, square wave, or other output wave shape.

The Drain terminals of MOSFETs 5, 7, 9 are connected in common as a first rail 11. The Source terminals of MOSFETs 6, 8, 10 are connected in common as a second rail 12. The Source terminal of MOSFET 5 and the Drain terminal of MOSFET 6 are connected to one another and to a phase winding 13 of stator 3. The Source terminal of MOSFET 7 and the Drain terminal of MOSFET 8 are connected to one another and to a phase winding 14 of stator 3. The Source terminal of MOSFET 9 and the Drain terminal of MOSFET 10 are connected to one another and to a phase winding 15 of stator 3. Although illustrated in a wye configuration having three phases, stator 3 may alternatively include a delta configuration and/or any number of phases (e.g., 5, 6, or 7 phases).

In an alternator mode, controller 16 may duty-cycle the voltage being provided to the excitation windings of rotor 2, thereby adjusting the induced AC voltage of stator coils 13-15 that is being provided to inverter/rectifier 4 and the resultant DC voltage across rails 11, 12. For example, such DC voltage may be around 14.0 to 14.7 volts for charging an automotive type battery having a 12 volt rating or label.

In a motoring mode, inverter/rectifier 4 acts as an inverter by providing electrical power as separate phases to coils 13-15, whereby stator 3 causes rotor 2 to rotate and drive the pulley(s) or other mechanical connections to the ICE. For example, MOSFETs 5-10 may be sequentially driven by controller 16 to provide three respective voltages to coils 13-15 that are 120 degrees out of phase with one another. Controller 16 may receive rotor information from a first sensor 17, a second sensor 18, and other sensors and/or devices. For example, sensor 17 and/or 18 may provide a signal to controller 16 indicative of the rotational speed of the rotor, herein referred to as revolutions per minute (rpm). Sensors 17, 18 may be Hall-effect, magneto-resistive, resolver, or other sensor type suitable for providing speed and angular position information. Such rotation information, for example, may be utilized for timing the switching of MOSFETs 5-10 to implement the inverter function.

Although not shown in FIG. 1, the respective Gate terminals of MOSFETs 5-10 are driven, directly or indirectly, by controller 16. An inverter/rectifier may alternatively be formed with distinct rectifying and inverting sections, and/or with additional structure such as for voltage regulation, voltage conversion, wave shaping, loss compensation, switchable topology, filtering, modulation, attenuation, amplification, impedance matching, timing, and others.

A first battery 19 includes a positive (+) terminal 21 and a negative (−) terminal 22, and a second battery 20 includes a positive (+) terminal 23 and a negative (−) terminal 24. Batteries 19, 20 are connected in series with a heavy gauge conductor 25 that joins (−) terminal 22 and (+) terminal 23. Although the exemplary embodiment of FIG. 1 shows only two batteries 19, 20, alternator-starter system 1 may include one or more additional batteries connected in the series string. The sensed battery 19 voltage is connected to controller 16 by a cable/conductor 26, and the sensed battery 20 voltage is connected to controller 16 by a cable/conductor 27, whereby the respective voltages may be remotely sensed by and/or utilized for powering controller 16. Additionally, cables 26, 27 may include respective conductors for passing battery temperatures to controller 16. For example, positive (+) battery terminals 21, 23 may each include a temperature sensor (not shown) for measuring respective battery post temperatures. Such temperature measurements may be utilized by controller 16 for adjusting battery charging profiles, voltages, and duration.

Positive (+) terminal 21 of battery 19 is connected to the Source terminal of a MOSFET switch "D" and negative (−) terminal 22 of battery 19 is connected to the Drain terminal of a MOSFET switch "B." Positive (+) terminal 23 of battery 20 is connected to the Source terminal of a MOSFET switch "C"

and negative (−) terminal 24 of battery 20 is connected to the Drain terminal of a MOSFET switch "A." The respective Drain terminals of MOSFETs D and C are connected to positive rail 11. The respective Source terminals of MOSFETs B and A are connected to negative rail 12. The respective Gate terminals of MOSFETs A-D are each connected to individual driver outputs of controller 16. Each MOSFET A-D is independently switchable by controller 16. Negative rail 12 is typically vehicle ground (chassis).

The forward power dissipation and related heat of a MOSFET device are typically lower than that of a rectifier diode because MOSFETs generally have a lower on-state impedance. Compared with a diode, the addition of a third terminal provides a MOSFET with the capability of electronic control of the device impedance and of the flow of current. The device impedance may have a very low forward voltage drop (saturation voltage) with the current being limited by an external load, and may have a very low leakage current during its off condition. In a switching mode, a MOSFET is either on or off, where the shortest possible times to accomplish the turn-on and turn-off are desirable. For example, a pair of MOSFETs may be arranged in a Darlington connection to increase gain, saturation voltage, and switching speed. Compared with bipolar transistors, MOSFETs have faster switching speeds with reduced delay, rise, storage, and fall times. MOSFETs are voltage controlled and may be driven by logic level signals. MOSFETs typically have a conduction voltage drop versus temperature characteristic that allows parallel MOSFETs to share current. A MOSFET typically does not block reverse voltage but instead acts as a switch. The "on" resistance of a MOSFET is a function of the gate-source voltage and the minimum rated RdsON channel resistance. The term "MOSFET" has become somewhat generic. For example, the previously metal gate material is now often a layer of polysilicon (polycrystalline silicon), and materials other than oxides may be used, such as different dielectric materials that are structured for obtaining strong channels with smaller applied voltages.

MOSFETs may include enhancement mode MOSFETs and depletion mode MOSFETs. In an enhancement mode MOSFET, a voltage drop across the oxide induces a conducting channel between the source and drain contacts via the field effect. The term "enhancement mode" refers to the increase of conductivity with increase in oxide field that adds carriers to the channel, also referred to as the inversion layer. The channel can contain electrons (called an nMOSFET or nMOS), or holes (called a pMOSFET or pMOS), opposite in type to the substrate, so nMOS is made with a p-type substrate, and pMOS with an n-type substrate. In a depletion mode MOSFET, the channel consists of carriers in a surface impurity layer of opposite type to the substrate, and conductivity is decreased by application of a field that depletes carriers from this surface layer. As used herein, a MOSFET may also refer an insulated-gate field-effect transistor (IGFET). MOSFET devices A-D may each include a diode (not shown) connected between the respective source and drain thereof. Such diodes are commonly referred to as anti-parallel or free-wheeling diodes, and are typically incorporated into the same package as the respective MOSFET. The free-wheeling diodes suppress voltage spikes at turn off/on. In an exemplary embodiment, MOSFETs A-D may be obtained from IXYS Corporation and have a part number IXT_170N075T2.

In operation, alternator-starter system 1 is either in alternator/generating mode or in motoring mode. It is generally desirable for an alternator-starter to operate at a lower voltage in generating mode and at a higher voltage in motoring mode. For example, higher voltage in motoring mode provides higher power and torque when starting an ICE. Lower voltage is generally desirable in generating mode. The voltage generated in alternator mode is Vs=Ns*dflux/dt, where Ns is the number of stator turns and dflux/dt is the flux rate of change. When the voltage Vs is increased, the stator turns and/or the rotor speed (dflux/dt) must also be increased. Increasing the number of stator turns is undesirable because this generally creates higher resistance, lower current and lower torque in motoring mode, and increased size, cost and weight. Increasing the gear or pulley ratio to thereby increase the rotor speed is also undesirable because this generally increases noise, inertia, and top end rotor speed.

First and second MOSFET switches are provided for each battery in a series battery string, where each switch may be individually turned on/off by controller 16. In alternator mode, this allows the switches to be opened/closed for selectively charging any individual battery at a low voltage. In motoring mode, this allows the higher voltage of a series string of batteries to be applied to and power the alternator-starter.

For example, in an embodiment of the FIG. 1 configuration, batteries 19, 20 each have a nominal voltage of 12 VDC. In alternator mode, when controller 16 determines that the voltage on Vsense line 26 is low, controller 16 turns on MOSFET switches B and D and turns off MOSFET switches A and C. As a result, positive (+) terminal 21 of battery 19 is connected to positive rail 11 and negative (−) terminal 22 of battery 19 is connected to negative rail 12. Controller 16 and a voltage regulator (not shown separately, and may be a part of controller 16) operate to maintain a rail voltage of about 14.0 to 14.7 volts for charging battery 19. In alternator mode, when controller 16 determines that the voltage on Vsense line 27 is low, controller 16 turns on MOSFET switches A and C and turns off MOSFET switches B and D. As a result, positive (+) terminal 23 of battery 20 is connected to positive rail 11 and negative (−) terminal 24 of battery 20 is connected to negative rail 12. Controller 16 and a voltage regulator (not shown) maintain a rail voltage of about 14.0 to 14.7 volts for charging battery 20.

Figure 2:
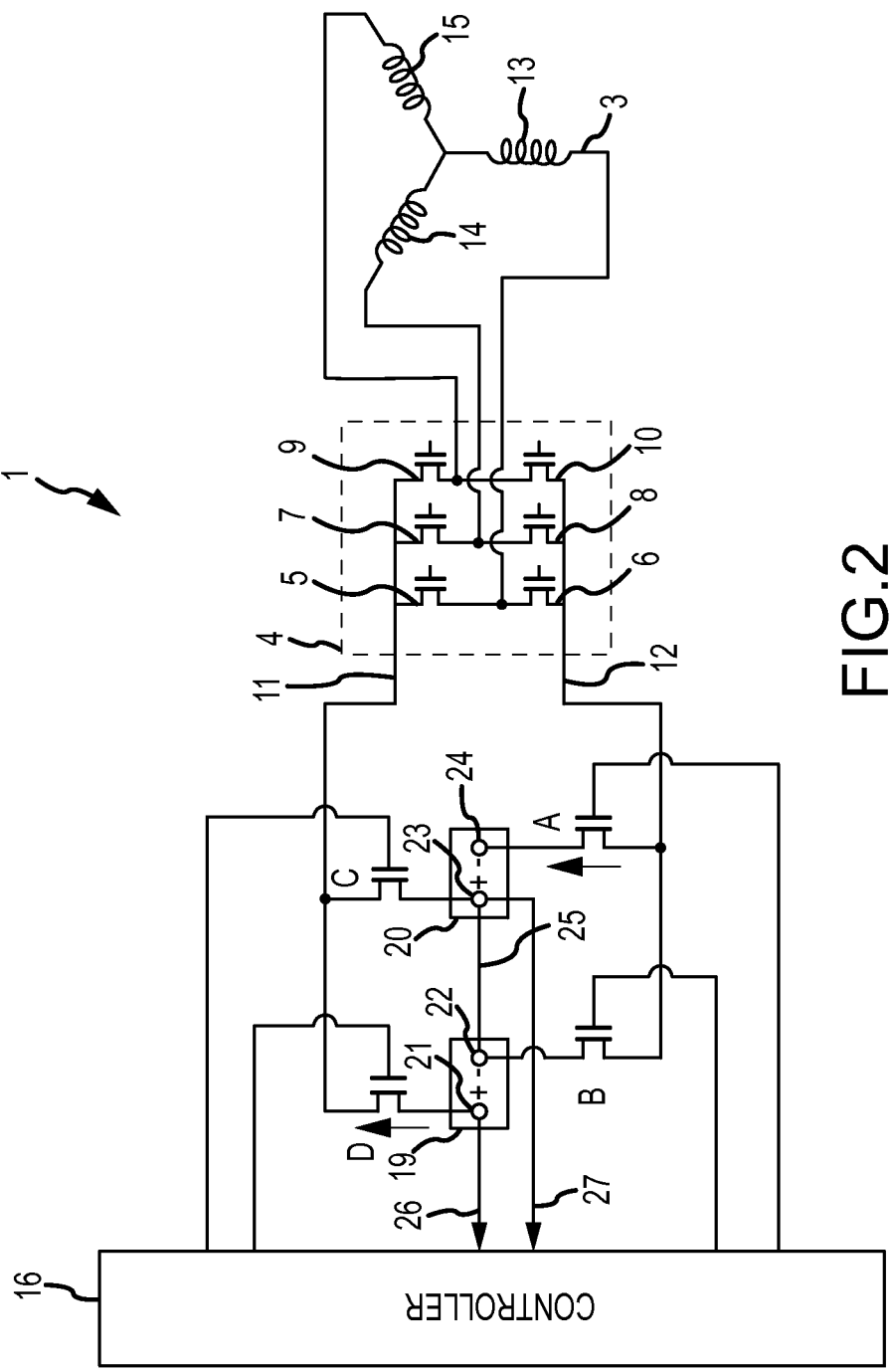
FIG. 2 illustrates a high voltage switch configuration for the system of FIG. 1.

In the alternator mode, when controller 16 determines that rotor 2 is rotating at a speed that exceeds a certain high speed, such as by evaluating rotation information obtained from sensors 17, 18, controller 16 turns MOSFET switches A and D on and turns MOSFET switches B and C off. As a result, batteries 19, 20 are charged in series. For example, controller 16 and a voltage regulator (not shown) maintain a rail voltage of about 24.0 to 29.4 volts for charging batteries 19, 20. This high voltage generating mode is possible because the high rotor speed provides sufficient dflux/dt to generate the higher charging voltage across rails 11, 12. FIG. 2 is a simplified schematic diagram of such high voltage configuration.

In motoring mode, the FIG. 2 operation where MOSFET switches A and D are closed may be used to allow inverter 4 to be supplied with the summed nominal voltage of 24 volts from the series battery string of batteries 19, 20. This provides more voltage and torque for cranking the ICE during starting.

Although system 1 is shown with only two batteries 19, 20 in series, an alternator-starter system in a given embodiment may be formed to have three, four, five, or any number of individual batteries connected in series. In such a case, for example, when each battery has a nominal 12 volt rating, the nominal rail voltage may be 12, 24, 36, 48, 60, etc. volts. Each such series battery has two corresponding MOSFET switches for connecting/disconnecting the respective battery to/from rails 11, 12. Each MOSFET switch may be individually controlled.

The disclosed alternator-starter system 1 provides many advantages. For example, separate charging devices are not required for charging multiple batteries. The use of multiple batteries provides insurance against failure of any single battery, whereby the remaining operational battery or batteries can still "limp home" the vehicle. Another advantage is the above-described high speed generating mode that takes advantage of the high dflux/dt at high rpm to simultaneously charge multiple batteries. For example, a 24 volt generating mode at high rpm provides improved efficiencies and higher charging output, while reducing the amount of overall switching of the MOSFET switches by switching two batteries into/out of charging at the same time. Another advantage of the disclosed alternator-starter system 1 is that both higher-voltage loads and lower-voltage loads may be connected. For example, a higher-voltage (e.g., 24 volt) load (not shown) may be connected across negative (−) terminal 24 and positive (+) terminal 21 to receive 24 volts when batteries 19, 20 are connected in series, and a lower-voltage (e.g., 12 volt) load may be connected across one of batteries 19, 20 to receive 12 volts.

Although the embodiments have been described in reference to a motoring mode for cranking the ICE during a starting operation, alternator-starter system 1 may also/alternatively be utilized in motoring mode for supplying motive force to a hybrid automotive engine. Such motive force may be employed as supplemental or short term power for a hybrid vehicle, for example by providing a mechanical power boost to a running ICE at selected times.

Figure 3:
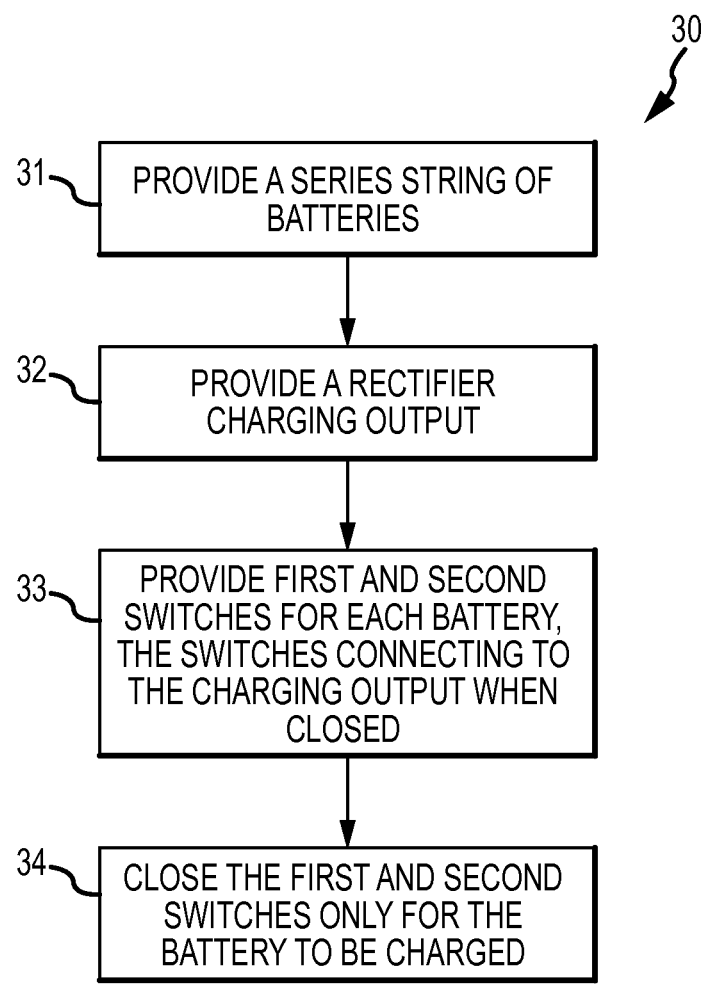
FIG. 3 is a simplified flowchart of a battery charging method, according to an exemplary embodiment.

FIG. 3 is a simplified flowchart of a battery charging method 30 according to an exemplary embodiment. Method 30 may be implemented in alternator-starter system 1, shown by example in FIG. 1. In step 31, a series battery string is formed by connecting individual batteries in an end-to-end manner so that the voltage across the entire battery string is the summed total of the individual batteries' voltages. The individual battery voltages are monitored, for example, by remote sensing that minimizes and/or compensates for measurement and cabling losses. In step 32, a rectifier is provided for receiving an AC voltage from coils of a stator, converting such voltage to a DC voltage, and providing the DC voltage as a charging output having a positive and a negative terminal. The rectifier may be configured as an inverter-rectifier or it may be provided as a separate structure. Associated structure (not shown) typically includes one or more voltage regulators and current limiting devices for regulating charging voltage, current, and other operating parameters. In step 33, first and second switches are provided for each one of the batteries of the series string. Each first switch is connected between the respective battery's positive terminal and the positive terminal or rail of the charging output. Each second switch is connected between the respective battery's negative terminal and the negative terminal or rail of the charging output. All switches are normally-open. In step 34, one of the batteries is selected for charging. For example, when a battery's voltage is determined to be below a predetermined threshold, such battery requires charging. The first and second switches connected to the selected battery are closed, thereby connecting the battery's positive and negative terminals to the positive and negative terminals of the charging output.

Figure 4:
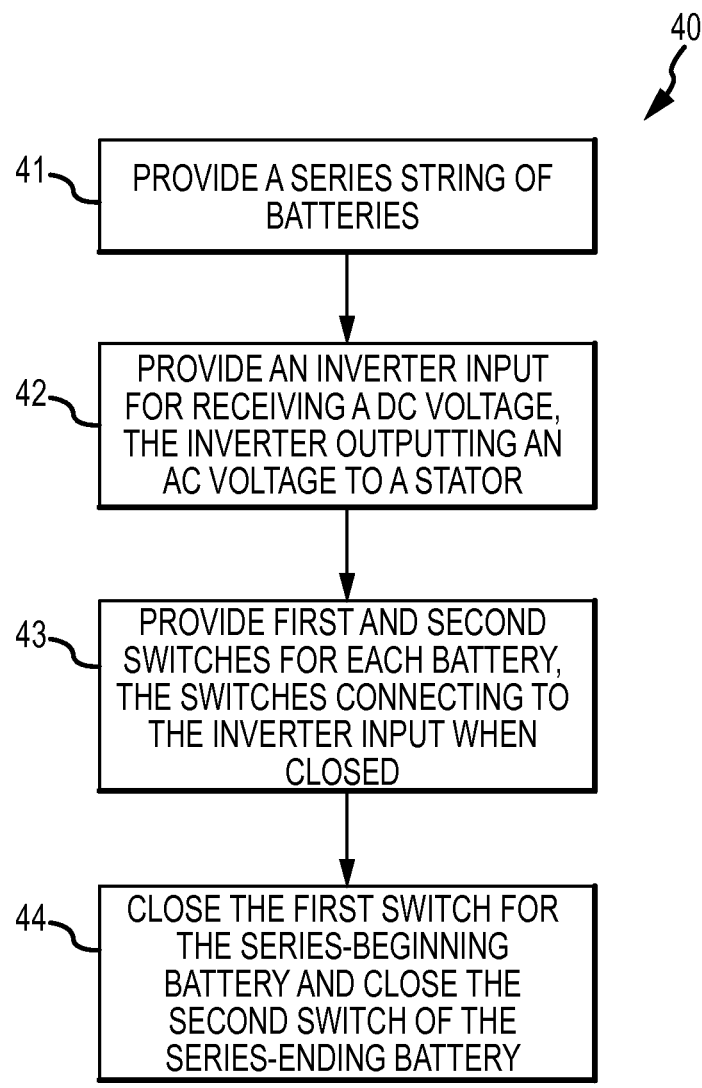
FIG. 4 is a simplified flowchart of a high voltage motoring method, according to an exemplary embodiment.

FIG. 4 is a simplified flowchart of a method 40 according to an exemplary embodiment. Method 40 may be implemented in alternator-starter system 1, shown by example in FIG. 1. In step 41, a series battery string is formed by connecting individual batteries in an end-to-end manner so that the voltage across the entire battery string is the summed total of the individual batteries' voltages. The individual battery voltages are monitored. In step 42, an inverter is provided for receiving a DC voltage on a positive terminal and a negative terminal, converting such voltage to an AC voltage, and providing the AC voltage to the phase coils of a stator. Associated structure may include wave shaping and timing circuitry and other devices. In step 43, first and second switches are provided for each one of the batteries of the series string. Each first switch is connected between the respective battery's positive terminal and the positive terminal or rail of the inverter input. Each second switch is connected between the respective battery's negative terminal and the negative terminal or rail of the inverter input. All switches are normally-open. In step 44, the first switch of a series-beginning battery of the battery string is closed and the second switch of a series-end battery of the battery string is closed to thereby provide a summed voltage of such series of batteries across the DC terminals of the inverter. For example, method 40 allows the summed voltages of the series battery string to be applied in motoring mode for cranking and starting an ICE.

Figure 5:
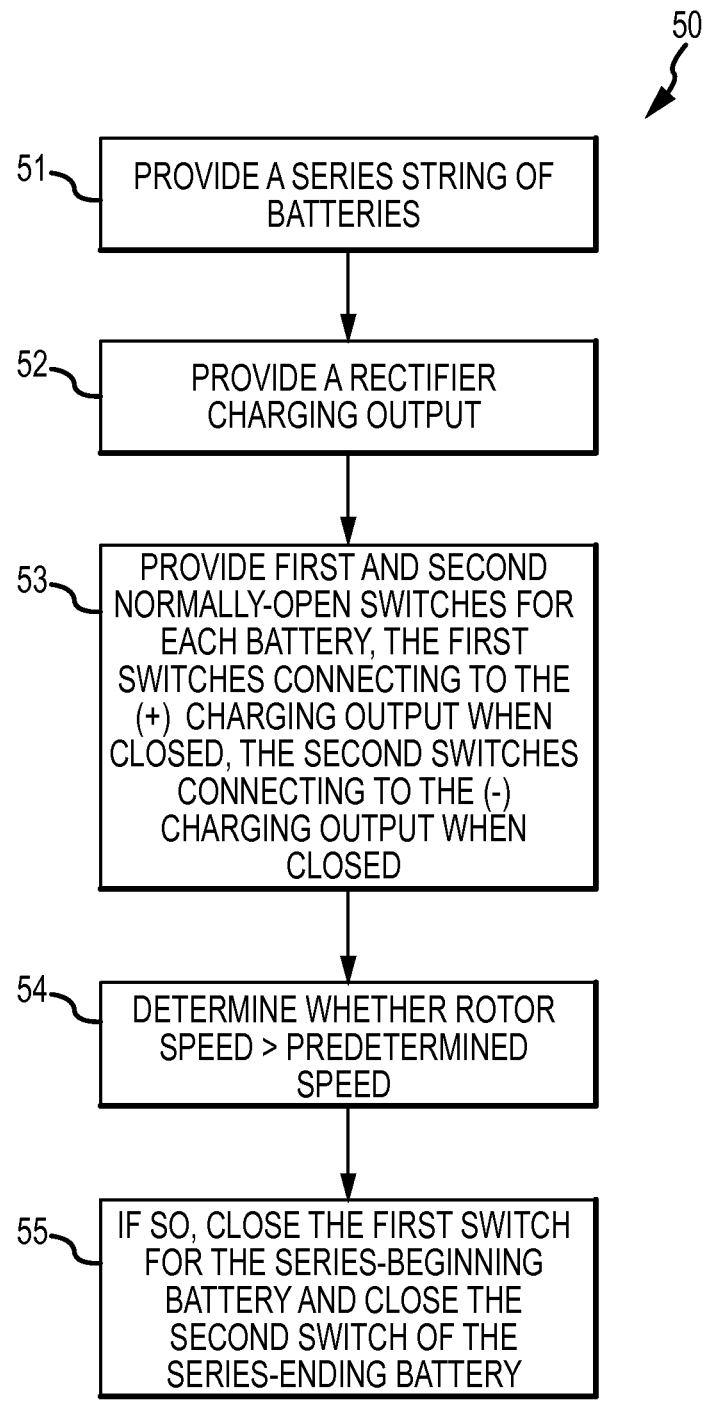
FIG. 5 is a simplified flowchart of a high voltage charging method, according to an exemplary embodiment.

FIG. 5 is a simplified flowchart of a battery charging method 50 according to an exemplary embodiment. Method 50 may be implemented in alternator-starter system 1, shown by example in FIG. 1. In step 51, a series battery string is formed by connecting individual batteries in an end-to-end manner so that the voltage across the entire battery string is the summed total of the individual batteries' voltages. The individual battery voltages are monitored, for example, by remote sensing. In step 52, a rectifier is provided for receiving an AC voltage from coils of a stator, converting such voltage to a DC voltage, and providing the DC voltage as a charging output having a positive and a negative terminal. The rectifier may be configured as an inverter-rectifier or it may be provided as a separate structure. Associated structure (not shown) typically includes one or more voltage regulators and current limiting devices. In step 53, first and second switches are provided for each one of the batteries of the series string. Each first switch is connected between the respective battery's positive terminal and the positive terminal or rail of the charging output. Each second switch is connected between the respective battery's negative terminal and the negative terminal or rail of the charging output. All switches are normally-open. In step 54, a determination is made regarding whether the rotational speed of the alternator-starter is greater than a predetermined speed. For example, information from sensor(s) may be continuously monitored to determine the rpm of a rotor. In step 55, when the rotor speed is greater than the predetermined amount, the first switch of a series-beginning battery of the battery string is closed and the second switch of a series-end battery of the battery string is closed to thereby allow the charging output of the alternator to charge each battery in the battery string. For example, method 50 allows an alternator-starter having a small size to take advantage of a high dflux/dt at high machine rpm, whereby a high voltage may be produced for charging more than one battery at a time.

In various embodiments, battery(s) at either end of a series connection of batteries may be switched in or out of the series battery string being charged or being used for motoring. A variable series string may be used, for example to adapt a nominal charging or motoring mode to account for additional operations that may affect efficiency or that may otherwise optimize performance of an alternator-starter. For example, in a start-stop hybrid automotive operation, actual machine loading, temperature, performance and operational profile information, and other parameters may be utilized in an adaptive structure. The temperature-related performance of a given battery may vary significantly according to the battery technology, and according to the actual temperature of operation. Accordingly, various embodiments may utilize monitored battery temperature(s) and/or battery performance profile information to adjust charging voltage target value(s) for series-connected batteries, for individual batteries, and/or for selecting which batteries of a series combination may be included by being switched into or out of a series string under use.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. An alternator-starter system mechanically coupled with an engine, comprising:
   a stator having three coils;
   an inverter/rectifier having three nodes connected to respective ones of the stator coils, the inverter/rectifier having an upper rail and a lower rail defining a DC bus;
   a plurality of batteries, each battery having a positive (+) terminal and a negative (−) terminal;
   first and second switches for each battery, the first switch being operable to switchably connect the upper rail with the respective (+) terminal, the second switch being operable to switchably connect the lower rail with the respective (−) terminal; and
   a controller operable to monitor voltages of each battery and operably coupled with the first and second switches for each battery wherein the controller selectively operates the alternator-starter system in a generating mode wherein the plurality of batteries are charged or a motoring mode wherein the alternator-starter system generates a mechanical torque and wherein when the alternator-starter system supplies a torque to the engine to start the engine in the motoring mode, the plurality of batteries are connected in series; and wherein when the controller operates the alternator-starter system in the generating mode, the controller is adapted to selectively charge individual ones of the plurality of batteries.

2. The system of claim 1, wherein when the monitored voltage of any one of the plurality of batteries is below a corresponding threshold voltage, the controller closes the one battery's first and second switches to charge such battery.

3. The system of claim 2, wherein the controller is operable to close the first switch of a series-beginning battery of the plurality of batteries and the second switch of a series-end battery of the plurality of batteries to supply a summed voltage of such series of batteries across the DC bus.

4. The system of claim 3, wherein the controller is operable to determine that the alternator-starter is operating in generating mode at a rotational speed higher than a certain rpm.

5. The system of claim 1, wherein the batteries comprise a first battery (B1) and a second battery (B2), wherein when the monitored voltage of battery B1 is below a first voltage, the controller closes the first B1 switch (D) and the second B1 switch (B) to charge battery B1, and wherein when the monitored voltage of battery B2 is below a second voltage the controller closes the first B2 switch (C) and the second B2 switch (A) to charge battery B2.

6. The system of claim 5, wherein the controller is operable to close switches A and D to supply a summed voltage of batteries B1 and B2 across the DC bus.

7. The system of claim 1, wherein when the controller determines that a battery of the plurality of batteries is broken, the controller opens at least one of the first and second switches corresponding to such broken battery.

8. The system of claim 1, wherein the controller is further operable to monitor battery temperature for each of the plurality of batteries.

9. A method of operating an alternator-starter for starting an engine and charging a plurality of batteries, the alternator-starter having an inverter/rectifier, the method comprising:
   providing two switches for each battery;
   monitoring voltages of each of the plurality of batteries;
   switching the switches to selectively charge individual ones of the plurality of batteries when the alternator-starter is operated in a generating mode; and
   connecting the plurality of batteries in series to supply electrical power to the alternator-starter when operating the alternator-starter in a motoring mode and supplying mechanical torque to the engine to start engine.

10. The method of claim 9, wherein when the monitored voltage of any one of the plurality of batteries is below a corresponding threshold voltage, closing the one battery's switches to connect such battery to the inverter/rectifier and thereby charge the battery.

11. A method of operating an alternator-starter having a stator with at least three coils, an inverter/rectifier having at least three nodes being connected to respective ones of the stator coils, the inverter/rectifier having an upper rail and a lower rail defining a DC bus, the method comprising:
   mechanically coupling the alternator-starter with an engine;
   providing a plurality of batteries, each battery having a positive (+) terminal and a negative (−) terminal;
   providing first and second switches for each battery, the first switch being operable to switchably connect the upper rail with the respective (+) terminal, the second switch being operable to switchably connect the lower rail with the respective (−) terminal;
   monitoring voltages of each battery;
   periodically charging the plurality of batteries with the alternator-starter wherein the switches are operable to charge the batteries in different configurations and the switches are operated to charge the plurality of batteries in series only when a rotational speed of a rotor of the alternator-starter exceeds a predetermined speed; and
   operating the switches to connect the plurality of batteries in series to supply electrical power to the alternator-starter when using the alternator-starter to supply torque to the engine to start the engine.

12. The method of claim 11, wherein when the monitored voltage of any one of the plurality of batteries is below a corresponding threshold voltage, closing the one battery's first and second switches to charge such battery.

13. The method of claim 11, further comprising closing the first switch of a series-beginning battery of the plurality of batteries and closing the second switch of a series-end battery of the plurality of batteries to thereby provide a summed voltage of such series of batteries across the DC bus.

14. The method of claim 13, further comprising determining when the rotational speed of the rotor of the alternator-starter exceeds the predetermined speed and, if so, providing the summed voltage across the DC bus, to thereby charge the series of batteries.

15. The method of claim 14, further comprising determining which batteries of the plurality of batteries to include in the series of batteries based on the rotational speed.

16. The method of claim 11, further comprising monitoring the temperatures of respective ones of the plurality of batteries.

17. The method of claim 16, further comprising defining a series voltage charging target for the series-connected batteries based on the monitored battery temperatures.

18. The method of claim 13, further comprising, in motoring mode of the alternator-starter, determining when rotational speed of a rotor of the alternator-starter exceeds a predetermined speed and, if so, reducing the summed voltage across the DC bus.

* * * * *